(12) United States Patent
Herrmann et al.

(10) Patent No.: US 11,339,687 B2
(45) Date of Patent: May 24, 2022

(54) POWER PLANT

(71) Applicant: E.ON Energy Projects GmbH, Munich (DE)

(72) Inventors: Stephan Herrmann, Munich (DE); Hartmut Spliethoff, Olching (DE)

(73) Assignee: E.ON Energy Projects GmbH, Munich (DE)

( * ) Notice: Subject to any disclaimer, the term of this patent is extended or adjusted under 35 U.S.C. 154(b) by 19 days.

(21) Appl. No.: 16/956,986

(22) PCT Filed: Dec. 12, 2018

(86) PCT No.: PCT/EP2018/084460
§ 371 (c)(1),
(2) Date: Jun. 22, 2020

(87) PCT Pub. No.: WO2019/121191
PCT Pub. Date: Jun. 27, 2019

(65) Prior Publication Data
US 2020/0392874 A1    Dec. 17, 2020

(30) Foreign Application Priority Data
Dec. 22, 2017 (DE) .......................... 102017223705.8

(51) Int. Cl.
*F01K 23/10* (2006.01)
*F01D 15/10* (2006.01)
(Continued)

(52) U.S. Cl.
CPC .............. *F01K 23/10* (2013.01); *F01D 15/10* (2013.01); *F01K 11/00* (2013.01); *F01K 19/00* (2013.01)

(58) Field of Classification Search
CPC .......... F01K 23/10; F01K 11/00; F01K 19/00; F01K 7/34; F01K 23/103; F01K 17/04;
(Continued)

(56) References Cited

U.S. PATENT DOCUMENTS 4,099,374 A * 7/1978 Foster-Pegg .......... F01K 23/067
60/39.12
4,274,256 A    6/1981 Kalt
(Continued)

FOREIGN PATENT DOCUMENTS

DE    2824321 A1    11/1979
DE    4409811 C1    5/1995
(Continued)

OTHER PUBLICATIONS

International Search Report and Written Opinion, Int'l Patent Application No. PCT/EP2018/084460, dated Mar. 27, 2019, 8 pages.

*Primary Examiner* — Hoang M Nguyen
(74) *Attorney, Agent, or Firm* — Casimir Jones, S.C.; Brian F. Bradley

(57) ABSTRACT

The invention relates to a power plant (1) for generating electric energy (100) and process steam (200), comprising: —a gas turbine (2) for driving a first generator (3) in order to generate electric energy (100) by combusting a fuel into flue gas (300), —a steam turbine (4) for driving a second generator (5) in order to generate electric energy (100), comprising a first stage (4a) for converting fresh steam (400) into residual steam (201), which constitutes at least part of the process steam (200), and —a waste heat steam generator (6) for generating the fresh steam (400) from fresh water (500) using the exhaust heat of the flue gas (300), wherein —the residual steam (201) has a residual steam pressure which is lower than the pressure of the fresh steam (400), —the waste heat steam generator (6) comprises a pre-heater (7) for pre-heating the fresh water (500) in order to form
(Continued)

Figure 1:
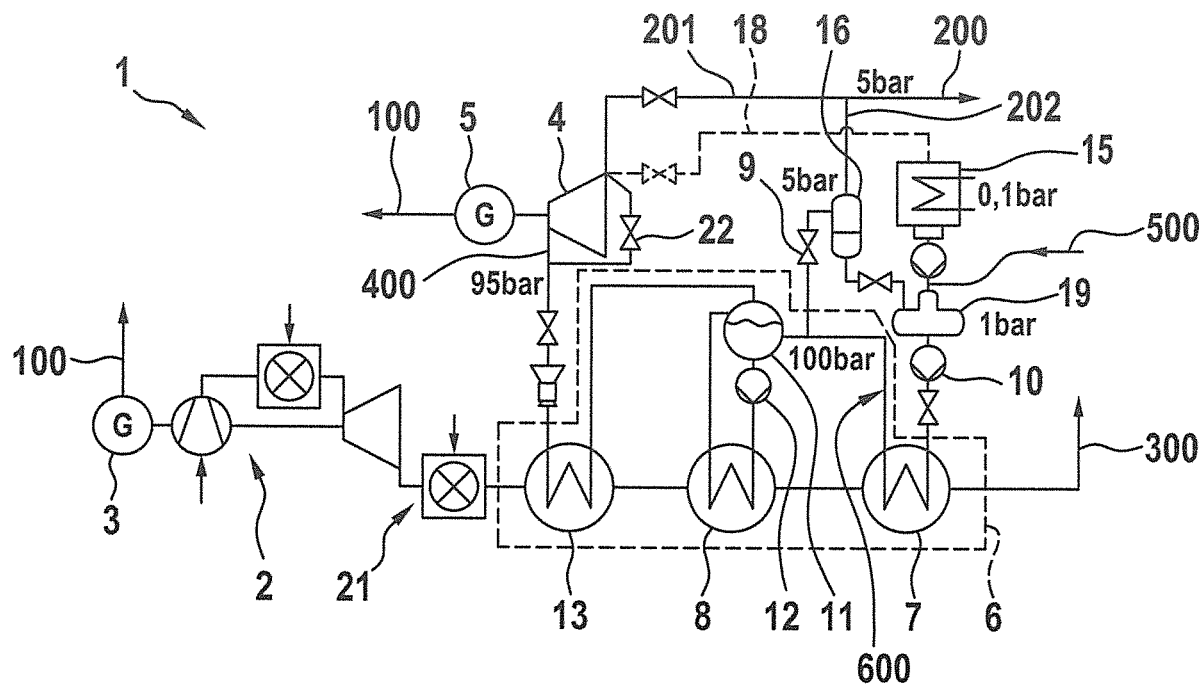

feed water (600) and an evaporator (8) for evaporating the feed water (600) in order to form the fresh steam (400), and
—the feed water (600) has a feed water pressure which is higher than the residual steam pressure. The invention is characterized by a throttle valve (9, 14) for expanding part of the feed water (600) either at the residual steam pressure in order to generate an additional steam (202) or at a drive steam pressure which is lower than the residual steam pressure in order to generate a drive steam (700) for operating a second stage (4b) of the steam turbine (4).

14 Claims, 3 Drawing Sheets

(51) Int. Cl.
*F01K 11/00* (2006.01)
*F01K 19/00* (2006.01)

(58) Field of Classification Search
CPC ........ F01K 23/101; F01D 15/10; Y02P 80/15; Y02E 20/14; Y02E 20/16; F22D 5/00

USPC .............................. 60/39.182, 653, 677–680
See application file for complete search history.

(56) References Cited

U.S. PATENT DOCUMENTS

| | | | |
|---|---|---|---|
| 4,998,408 | A | 3/1991 | Wiekmeijer |
| 5,044,163 | A | 9/1991 | Bruckner et al. |
| 5,251,432 | A | 10/1993 | Bruckner et al. |
| 6,167,692 | B1* | 1/2001 | Anand ...................... F02C 1/00 60/39.12 |
| 2005/0034445 | A1* | 2/2005 | Radovich ................ F01K 23/10 60/39.182 |
| 2012/0067057 | A1* | 3/2012 | Hofmann ................ F02C 7/047 60/775 |
| 2014/0090356 | A1* | 4/2014 | Nakamura ............ F01K 23/103 60/39.182 |

FOREIGN PATENT DOCUMENTS

| | | |
|---|---|---|
| DE | 19944920 B4 | 3/2001 |
| EP | 0410111 A1 | 1/1991 |

\* cited by examiner

POWER PLANT

The invention relates to a power plant for generating electrical energy and extraction steam (gas and steam power plant). In particular, the power plant according to the invention is provided with a gas turbine and operates in accordance with power/heat coupling. In the power plant, a quantity of the extraction steam is maximized. Consequently, fuel in the gas turbine or an additional firing can be saved since required process steam is provided with little energy consumption. Consequently, both the operating costs of the power plant and the $CO_2$ emission thereof can be reduced.

From the prior art, gas and steam power plants with power/heat coupling are known. For example, U.S. Pat. No. 5,044,163 A discloses such a power plant. In this power plant, however, no provision is made for removal of process steam. From the prior art, power plants are also known in which process steam can be removed. Typically, such power plants are constructed specifically for industrial consumers of electric power and heat. The discharge of heat is carried out in the form of process steam. Advantageously, the consumers have a continuous requirement for energy. There is present in such power plants a gas turbine whose flue gas is used to evaporate feed water, wherein the fresh steam produced in this manner drives a steam turbine. After passing through the steam turbine, the residual steam can be removed from the power plant as process steam and can be used for other processes.

Other power plants are known, for example, from DE 199 44 920 B4 or DE 28 24 321 A1. Furthermore, DE 712 163 A describes another power plant.

In known power plants, in particular at low temperatures of the flue gas, the heat thereof cannot be used in an optimum manner so that the heat of the flue gas is lost. This leads to a reduced degree of efficiency of the entire power plant.

An object of the invention is therefore to improve a degree of efficiency of a gas and steam power plant.

The object is achieved by the features of the independent claim. The dependent claims relate to preferred developments of the invention.

The object is consequently achieved with a power plant for generating electrical energy and process steam. The power plant comprises a gas turbine, a steam turbine and a heat recovery steam generator. The heat recovery steam generator is constructed with at least one stage but may in particular also be constructed with several stages. The gas turbine serves to drive a first generator for generating electrical energy by burning a fuel to form flue gas. The steam turbine serves to drive a second generator. The steam turbine has at least a first stage, in particular a high-pressure stage, in order to convert fresh steam to residual steam. In this manner, energy is removed from the fresh steam in order to drive the generator. The residual steam represents at least a portion of the process steam which can be removed from the power plant. Consequently, in particular the entire residual steam or at least a portion of the residual steam is removed from the power plant as process steam. The heat recovery steam generator serves to produce the fresh steam from fresh water by means of a waste heat of the flue gas. The fresh water can either be supplied to the power plant particularly in order to compensate for removed process steam and/or can be obtained from a portion of the residual steam by the steam being condensed. The heat recovery steam generator comprises in particular a plurality of heat exchangers in order to convert the fresh water to the fresh steam. There is provision for the residual steam to have a residual steam pressure which is lower than a fresh steam pressure of the fresh steam. Consequently, the fresh steam has a higher level of energy than the residual steam, which can be used in the steam turbine to drive the second generator. The steam turbine may only have the first stage, in particular the high-pressure stage. In this instance, the steam turbine is constructed in one stage. Alternatively, the steam turbine may also have an additional second stage, in particular a low-pressure stage. In this instance, the steam turbine is constructed in two stages.

There is provision for the heat recovery steam generator to have a preheater and an evaporator. The preheater serves to preheat the fresh water to form feed water. The evaporator serves to evaporate the feed water to form fresh steam. In this instance, there is in particular provision for the preheater and the evaporator to each comprise a heat exchanger which are introduced into a current of the flue gas. The evaporator is in this instance arranged at a hotter location of the current of flue gas than the preheater. The feed water has in particular a feed water pressure which is higher than the residual steam pressure. The feed water pressure is in particular constructed by a pump unit, via which the fresh water can be pumped through the preheater. In a particularly advantageous manner, the feed water pressure is a pressure between 50 bar and 150 bar, preferably between 80 bar and 120 bar, particularly approximately 100 bar. The residual steam pressure is in particular a pressure between 1 bar and 10 bar, in particular between 3 bar and 7 bar, in a particularly preferred manner approximately 5 bar. The fresh steam pressure is at full load in particular the feed water pressure minus 2 bar to 5 bar of pressure loss, at part-load operation in particular a pressure between 10 bar and 20 bar, in particular between 13 bar and 17 bar, in a particularly preferred manner approximately 15 bar.

The power plant further has a throttle valve or a plurality of throttle valves which are arranged in stages, and preferably at least one water separator. The at least one throttle valve is constructed to depressurize a portion of the feed water. In this instance, the throttle valve may be constructed to depressurize the portion of the feed water either to the residual steam pressure or alternatively to a drive steam pressure. In the case of depressurization to the residual steam pressure, additional steam is generated and has the same steam pressure as the process steam. Consequently, the additional steam and the process steam can be removed from the power plant in order to increase a steam removal. In the case of depressurization to the drive steam pressure, a drive steam is generated. The drive steam serves in particular to operate a second stage of the steam turbine. The drive steam pressure is lower than the residual steam pressure. In particular, the drive steam pressure is a pressure between 0.1 bar and 3 bar, in particular between 0.3 bar and 0.7 bar, in a particularly preferred manner approximately 0.5 bar. If the power plant is in part-load operation, the drive steam pressure is in particular lower than at full-load operation. The drive steam pressure is in part-load operation preferably considerably lower than at full-load operation. The second stage of the steam turbine is in particular a low-pressure stage, for which reason the lower drive steam pressure is sufficient to drive the steam turbine, in particular at minimum mass flow. Consequently, no residual steam which is discharged from the first stage has to be used to drive the second stage. Instead, it is made possible for all of the residual steam to be able to be discharged as process steam.

As a result of the power plant according to the invention, in particular in part-load operation, a degree of efficiency is considerably increased. This is a result of the fact that a steam decoupling from the power plant is increased by the quantity of process steam being increased. This is achieved either by the additional steam also being removed as process steam in addition to the residual steam or by a second stage of the steam turbine not having to be operated or having to be operated only in a reduced state with the residual steam from the first stage, whereby a greater proportion of the residual steam can be removed as process steam. Since the power plant makes provision for feed water to be removed prior to the evaporation, a higher throughflow through the preheater can be achieved without the steam generation being notably influenced. As a result of the higher throughflow of fresh water through the preheater, there is produced improved cooling of the flue gas so that the thermal energy of the flue gas can also be used in an optimum manner at lower temperatures. This leads to an increased degree of efficiency of the power plant. In particular, a control device is present in which the mass flow of the fresh water and the throughflow of the feed water through the throttle valve is controlled in such a manner that the throughflow through the evaporator remains uninfluenced by the measure and at the same time an optimum cooling of the flue gas is carried out. An optimum cooling of the flue gas is in particular present when the flue gas is cooled to 100° C., preferably to 90° C. In a particularly advantageous manner, the cooling is carried out as far as a sulfuric acid dew point or as far as a predefined tolerance range around the sulfuric acid dew point, wherein the value in particular does not fall below the sulfuric acid dew point in order to prevent corrosion.

In a preferred embodiment, there is provision for the throttle valve to be an additional steam throttle valve. The additional steam throttle valve serves to depressurize the portion of the feed water to the residual steam pressure in order to generate the additional steam. Consequently, there is provision, after the depressurization of the portion of the feed water to the residual steam pressure, for the additional steam to be removed from the power plant. To this end, the additional steam is mixed at the residual steam pressure in order to form the process steam. The power plant is consequently configured for the additional steam to be able to be mixed with the residual steam in order to form the process steam. Consequently, the quantity of process steam which can be removed from the power plant is increased. Since the increased quantity of the process steam results from the fact that a higher mass flow flows through the preheater, it is further made possible for the flue gas to be cooled to a low temperature. In particular, the flue gas is cooled to a lower temperature than in the prior art, whereby a larger quantity of thermal energy is removed from the flue gas. Consequently, the provided energy of the flue gas can be used better than in the prior art.

In another preferred embodiment, there is provision for the steam turbine to be constructed in two stages. Consequently, the steam turbine has a second stage in addition to the first stage described above. The second stage is in particular a low-pressure stage and serves to convert a drive steam into a loss steam. The loss steam is provided only for condensation and is in particular not further used. The drive steam can advantageously be generated by depressurizing residual water from the additional steam at a drive steam throttle valve. In particular, the drive steam which is produced in this manner corresponds to the drive steam described above, wherein in this embodiment the drive steam is produced not from the feed water directly, but instead from the residual water of the additional steam. To this end, the residual water is separated from the additional steam and depressurized again by the drive steam throttle valve. Since the drive steam pressure is lower than the residual steam pressure, such a depressurization is possible in order to operate the second stage, in particular the low-pressure stage, of the steam turbine. The second stage, in particular the low-pressure stage, typically has a minimum mass flow, below which a value must not fall in order to prevent the ventilation. For example, the value must not fall below the limit of 10% of the mass flow. In the prior art, this minimum mass flow is generally branched off from the residual steam and consequently cannot be used for the process steam. If the second stage is operated with the minimum mass flow, however, there is at the input thereof as a result of Stodola's law already a low pressure since a low pressure drop prevails over the second stage of the turbine. As already described, the drive steam pressure is lower than the residual steam pressure so that in the prior art the residual pressure has to be significantly throttled in order to achieve the drive steam pressure. Therefore, the minimum mass flow is intended to be obtained from the additional steam in an optimum manner so that the residual steam does not have to be used to drive the second stage. This leads in particular in part-load operation to a considerable increase of the degree of efficiency of the power plant. This is supported in particular in that the preheater is intended to be configured for part-load operation, whereby the preheater in part-load operation is oversized. This is used by the higher fresh water flow through the preheater in order to generate the additional steam and/or drive steam.

In an alternative embodiment to the above-described embodiment, there is provision for the steam turbine to again be constructed in two stages, wherein the second stage, in particular a low-pressure stage, is constructed to convert the drive steam into loss steam. Again the loss steam is provided for condensation and is in particular not further used. The drive steam is advantageously generated by the throttle valve, which is a drive steam throttle valve. This is carried out by the portion of the feed water being depressurized to the drive steam pressure, whereby the drive steam is generated by the drive steam throttle valve. In this instance, there is no generation of additional steam so that the residual steam represents the entire process steam. However, since no residual steam has to be used to drive the second stage but instead the second stage is driven by the drive steam, the entire residual steam can constitute the process steam. In particular, the same advantages as in the preceding embodiments are afforded. Consequently, it is again possible for the quantity of feed water to be increased by increasing the mass flow through the preheater, wherein a portion of the feed water is converted into drive steam in order to operate the second stage of the steam turbine. This in turn leads to an increase of the degree of efficiency of the power plant since the flue gas can be cooled to lower temperatures in order consequently to use an available quantity of heat of the flue gas in an optimum manner. An advantage of this embodiment is particularly the simplified circuit.

At an operating point which requires only little process steam, the electrical degree of efficiency of the power plant, in particular with a single-stage steam turbine, can be increased with respect to a conventional power plant without an additional steam throttle valve by the process steam advantageously being provided completely by the additional steam and consequently via the additional steam throttle valve. There is consequently no discharge of residual steam as process steam. The entire residual steam can consequently be discharged via a bypass, in particular directed into the condenser. The residual steam may thereby have a significantly lower pressure than a required process steam pressure, whereby the power output of the steam turbine is increased.

The power plant advantageously has a feed water pump device. The feed water pump device serves to convey fresh water through the preheater and to generate the feed water pressure.

The feed water pump device comprises at least one pump, advantageously two or more pumps. In the power plant, generally only a single pump of the feed water pump device is active, whilst the remaining pumps are reserved as replacements. During a removal of feed water by depressurizing the feed water at the throttle valve, a higher mass flow through the feed water pump device is required than without such a removal. Therefore, the second or additional pump which is reserved as a replacement can advantageously be used during the removal and the depressurization of the feed water at the throttle valve in order to increase the mass flow through the preheater.

Advantageously, there is provision for the heat recovery steam generator to have a steam drum. The steam drum serves to separate fresh steam and feed water. From the steam drum, the fresh steam can be supplied to the steam turbine, wherein the fresh steam prior to being supplied through the steam turbine is advantageously superheated in a heater. The superheater is in particular fitted at a hottest location of the current of the flue gas. Furthermore, the feed water from the preheater can be supplied to the steam drum. The steam drum thus serves in particular to separate the feed water from the fresh steam. In particular, the feed water can be removed at any location between the steam drum and the preheater, in a particularly preferred manner also at any location of the preheater, and depressurized by the throttle valve.

In a particularly advantageous manner, there is provision for the heat recovery steam generator to have a conveyor pump for conveying feed water from the steam drum through the evaporator back into the steam drum. Consequently, fresh steam can be generated from the feed water. In the steam drum, the generated fresh steam is separated from the remaining feed water so that exclusively fresh steam without the feed water can be supplied to the steam turbine.

The power plant advantageously further has an additional steam separation container. Alternatively or additionally, the power plant advantageously has a drive steam separation container. The additional steam separation container serves to separate residual water from the additional steam. The drive steam separation container serves to separate residual water from the drive steam. Consequently, as a result of the respective separation containers, the additional steam or the drive steam can be separated from the residual water, which has not evaporated at the corresponding throttle valve. The residual water which has been separated from the additional steam can in particular be depressurized again in order to produce the drive steam. The residual water which has been separated from the drive steam is in particular condensed or cooled and supplied again to the preheater as fresh water. On the whole, the respective residual water depending on the pressure level in a condenser and upstream of, in or downstream of the degasser can be returned to the feed water. In the last case, the pressure must in particular be greater than 1 bar, whereby the degasser can be heated. The residual water which is still hot can in this instance at least partially cover the heat requirement of the degasser. As a result of a variable distribution of the residual water over a supply to the condenser and downstream of the condenser, the entry temperature into the preheater can be controlled so that in particular a value does not fall below the sulfuric acid dew point at the outlet of the heat recovery steam generator. Residual water which has not evaporated can in particular be used in a heat exchanger for combustion gas preheating. Preferably, the residual water which has not evaporated can also be used after a pressure increase in a pump by means of injection into the combustion gas for efficient preheating with steam saturation in the combustion gas, which leads to a reduction of emissions and to an increase in power. Consequently, the energy of the residual water can be used in an optimum manner in order to further increase the degree of efficiency of the power plant.

The power plant further advantageously has a bypass. Via the bypass, the residual steam can be transferred from an output of the steam turbine to a condenser or from an output of the first stage to an input of the second stage. Consequently, in particular residual steam which is not removed as process steam can be discharged.

The throttle valve is advantageously fitted to an output of the preheater. Consequently, the feed water is preferably removed at an output of the preheater, that is to say, at a hottest location of the preheater. Alternatively, the throttle valve may be fitted at any other location of the preheater. In particular, there is provision for the preheater to have a first preheating region and a second preheating region which are arranged one behind the other and between which the throttle valve is fitted. In this instance, the feed water is removed from the center of the preheater.

As a result of the power plant according to the invention, it is possible to configure the selection of the fresh steam pressure independently of the mass flow from the preheater. In particular, for the formation of the properties of the fresh steam, a temperature above the pinch point is significant, whilst the increase of the mass flow through the preheater involves only effects on the region below the pinch point. In particular, a cooling of the flue gas, advantageously with an active additional firing, can also be optimized by adapting the mass flow through the preheater.

The additional mass flow through the preheater may in a preferred embodiment be between 0% and 200% of the mass flow originally provided for the production of the fresh steam. In a particularly advantageous embodiment, this mass flow is between 20% and 50% of the mass flow originally provided for the production of the fresh steam. In particular, the throughflow through the preheater is adapted for each operating point in such a manner that an optimum cooling of the flue gas is carried out whilst, at the same time, the mass flow through the evaporator is not influenced by the current through the preheater.

Advantageously, the power plant has a high-pressure bypass. This means that the steam turbine, in particular a high-pressure turbine, is bypassed by an additional, alternative bypass path with an individual throttle valve and injection cooling, whereby the quantity of the residual steam is increased in order to consequently increase the quantity of process steam. The high-pressure bypass comprises in particular a throttle and/or a hot water injection in order to depressurize the fresh steam which is directed via the high-pressure bypass past the steam turbine to the residual steam pressure and to mix it with the residual steam. Alternatively or additionally, an additional firing may be provided. The additional firing enables an additional heating of the flue gas after it has been discharged from the gas turbine. Consequently, a larger quantity of heat is available for the heat recovery steam generator. As a result of all these measures, the quantity of process steam produced can be maximized.

Preferably, there is provision for the throttle valve for generating the additional steam and/or drive steam to be configured to depressurize such a quantity of feed water as to achieve a predefined cooling of the flue gas at all load locations. The quantity of feed water which is removed by the throttle valve is controlled in accordance with which cooling of the flue gas is intended to be achieved. Consequently, there is always produced an optimum cooling of the flue gas.

It is also advantageous for the throttle valve to be configured to depressurize the feed water only in part-load operation of the power plant. Consequently, the removal of feed water at the throttle valve takes place only when the power plant functions in part-load operation. Particularly during part-load operation, the generation of drive steam or additional steam has a significant effect on the degree of efficiency of the power plant.

Figure 2:
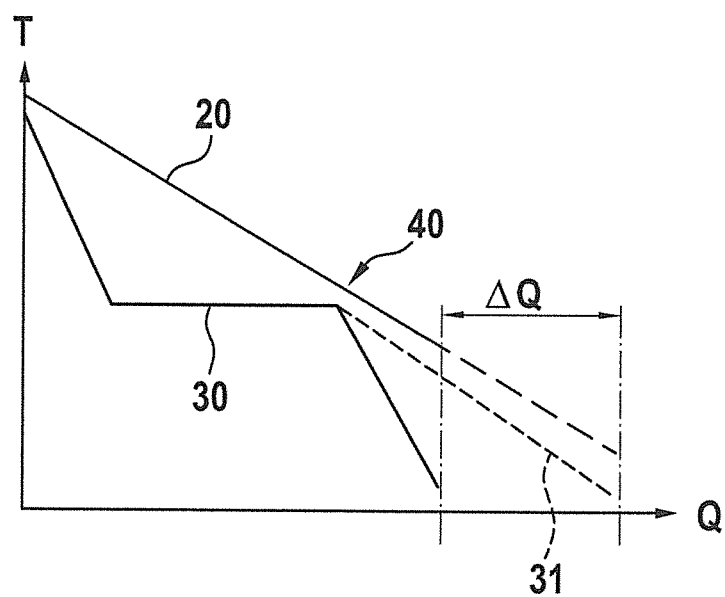
Figure 3:
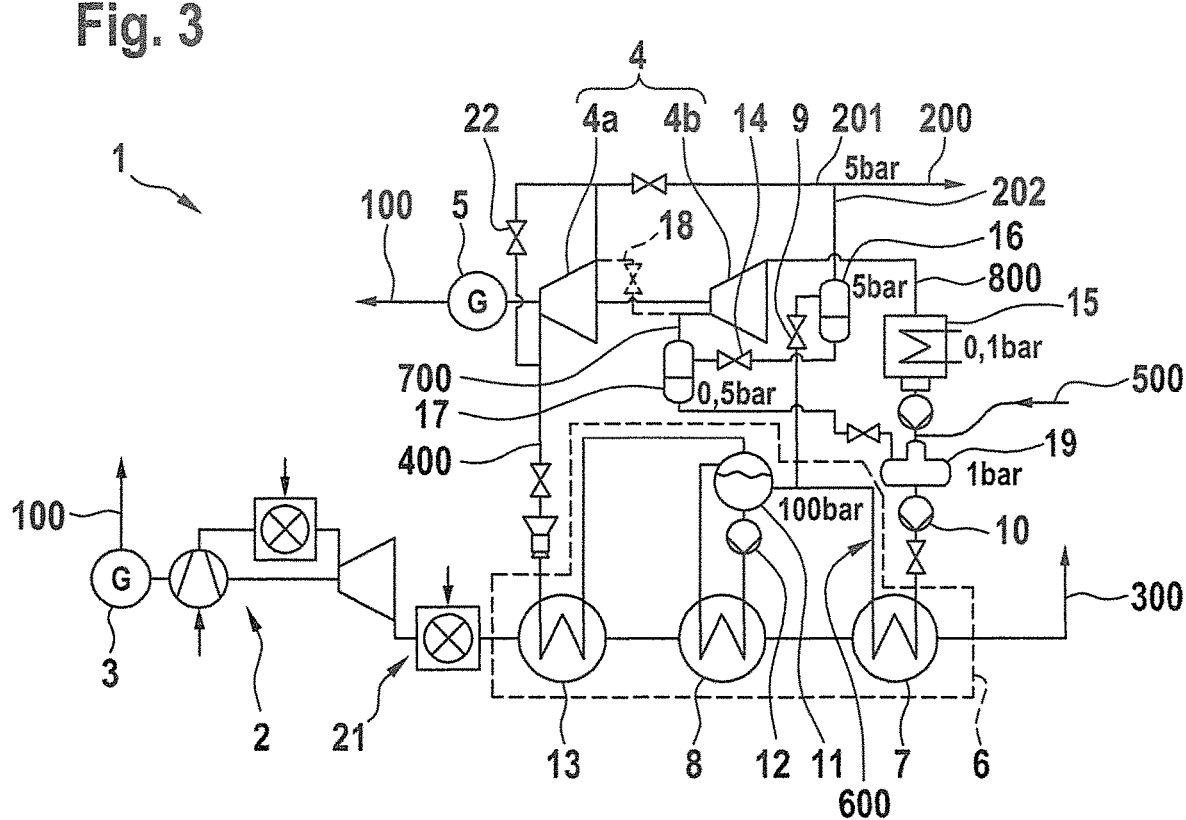
Figure 4:
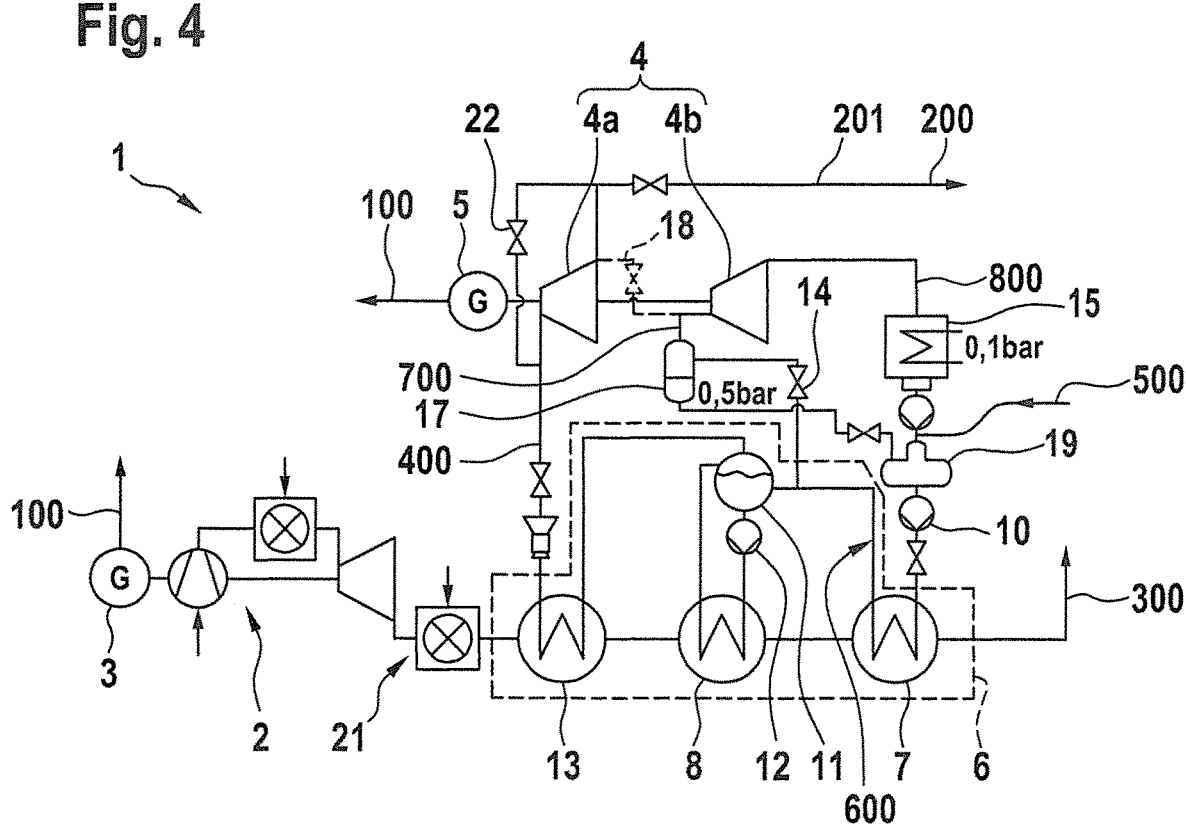
Figure 5:
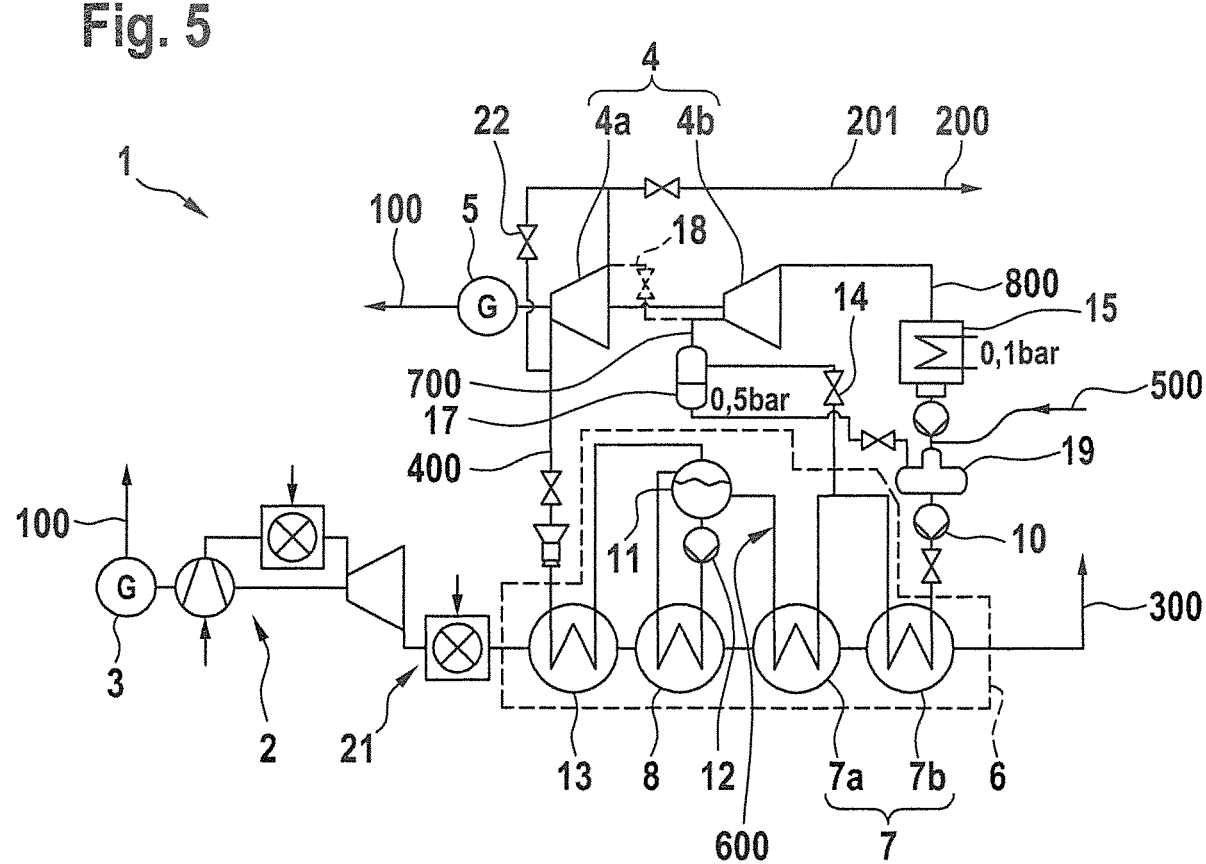

Other details, advantages and features of the present invention will be appreciated from the following description of embodiments with reference to the drawing, in which:

FIG. 1 is a schematic illustration of a power plant according to a first embodiment of the invention, FIG. 2 is a schematic view of a Q/T graph of the power plant according to the first embodiment of the invention, FIG. 3 is a schematic view of a power plant according to a second embodiment of the invention, FIG. 4 is a schematic view of a power plant according to a third embodiment of the invention, and FIG. 5 is a schematic view of a power plant according to a fourth embodiment of the invention.

FIG. 1 is a schematic illustration of a power plant 1 according to a first embodiment of the invention. The power plant 1 is a gas and steam power plant with power/heat coupling and comprises a gas turbine 2 and a steam turbine 4. The gas turbine 2 serves to drive a first generator 3, by which electrical energy 100 can be discharged. The steam turbine 4 serves to drive a second generator 5, by which electrical energy 100 can also be discharged.

Operation of the gas turbine 2 generates flue gas 300 which is cooled in a heat recovery steam generator 6 in order to be able to use waste heat of the flue gas 300. An additional firing 21 may in particular be provided between the gas turbine 2 and the heat recovery steam generator 6 in order to additionally heat the flue gas 300. The heat recovery steam generator 6 comprises a preheater 7, an evaporator 8 and an superheater 13 which are provided for heat exchange. To this end, fresh water 500 is supplied from outside or obtained via a degasser 19 from condensed steam of the power plant 1. The fresh water 500 is conveyed by means of a feed water pumping device 10 through the preheater 7 and pressurized, whereby feed water 600 is provided at a feed water pressure. The feed water 600 is transferred into a steam drum 11. In the example shown in FIG. 1, the feed water pressure is 100 bar. From the steam drum 11, the feed water 600 is conveyed via a conveyor pump 12 through the evaporator 8. This leads to the evaporator 8 at least partially evaporating the feed water 600, wherein a fresh steam 400 which is generated in this manner is supplied to the steam drum 11 again. In the steam drum 11, the fresh steam 400 is separated from the feed water 600. The fresh steam 400 is superheated by the superheater 13 and subsequently supplied to the steam turbine 4. The steam turbine 4 removes energy from the fresh steam 400 and using this energy drives the second generator 5 so that, at an output of the steam turbine 4, a residual steam 201 is discharged. The residual steam 201 has a residual steam pressure which is 5 bar in the embodiment shown in FIG. 1 and consequently is in particular lower than a fresh steam pressure of, for example, 95 bar. A high-pressure bypass 22 may also in particular be provided. This means that the steam turbine 4 is bypassed via an alternative bypass path with a throttle and in particular also injection cooling by means of hot water injection (not shown) in order to generate a larger quantity of residual steam 201.

In order to drive the steam turbine 4, consequently, the fresh water 500 is first preheated in the preheater 7 in order to obtain the feed water 600, the feed water 600 is subsequently evaporated to form fresh steam 400 in the evaporator 8 and finally the fresh steam 400 is superheated in the superheater 13. Therefore, there is in particular provision for the superheater 13 to be arranged at the hottest location of a current of the flue gas 300, the evaporator 8 to be arranged downstream of the superheater 13 and the preheater 7 to be arranged downstream of the evaporator 8 and consequently at a coldest location of the current of the flue gas 300.

There is further provision for an additional steam throttle valve 9 to be provided. The additional steam throttle valve 9 is arranged between the steam drum 11 and the preheater 7 and serves to remove feed water 600. The feed water 600 is depressurized in the additional steam throttle valve 9 to the residual steam pressure, that is to say, to 5 bar in the embodiment shown in FIG. 1, and supplied to an additional steam separation container 16. The additional steam separation container 16 serves to separate residual water from the additional steam 202, wherein the additional steam 202 is mixed with the residual steam 201 in order to thus produce the process steam 200 which can be removed from the power plant 1. Such a mixing is readily possible since, as a result of the additional steam throttle valve 9, the additional steam 202 has the same pressure as the residual steam 201. The residual water which was separated in the additional steam separation container 16 is in particular supplied to the degasser 19 in order to consequently be able to be used again as feed water 600.

As a result of the branching-off of feed water 600 at the additional steam throttle valve 9, a larger quantity of feed water 600 is naturally required than without such a branching. This means that the mass flow through the preheater 7 with branching of feed water 600 is greater than without branching of feed water 600. Consequently, there is produced more significant cooling of the flue gas 300, whereby the thermal energy of the flue gas 300, in particular at low temperatures, can be used in an optimum manner. In particular, the energy of the flue gas 300 is used in addition to the residual steam 201 to produce additional steam 202 so that the entire quantity of process steam 200 which can be discharged is increased. A degree of efficiency of the power plant 1 is thereby improved. In particular in part-load operation, the preheater 7 is oversized since it is intended to be configured for full-load operation. Consequently, the capacity of the pre-heater 7 can be exploited by additional feed water 600, which is depressurized by the additional steam throttle valve 9 to form additional steam 202, being generated.

If all of the process steam 200 produced is not required or removed, the residual steam 201 is completely or partially condensed in a condenser 15. To this end, there is provided a bypass 18, by means of which the output of the steam turbine 4 is connected to the condenser 15. From the condenser 15, there is a transfer of the condensed original residual steam 201 to the degasser 19.

The additional steam throttle valve 9 can in particular be controlled. A removal of feed water 600 can thus be controlled, which in particular results in a throughflow quantity through the preheater 7 also being able to be controlled. A throughflow through the preheater 7 can thus be adjusted in such a manner that, on the one hand, the mass flow through the evaporator 8 is not influenced, at the same time the flue gas 300 is also cooled in an optimum manner. In particular, the flue gas 300 is cooled to a lower residual temperature above a sulfuric acid dew point, for example, to a residual temperature of 90° C.

At an operating point, in which only little process steam is required, the electrical degree of efficiency of the power plant 1 can be increased with respect to a conventional power plant without an additional steam throttle valve 9 by the process steam 200 being provided completely by the additional steam 202 and consequently via the additional steam throttle valve 9. There is consequently no discharge of residual steam 201 as process steam. All the residual steam 201 can consequently be directed via the bypass 18 into the condenser 15 and can thereby have a significantly lower pressure than the process steam pressure, whereby the power output of the steam turbine 4 is increased.

FIG. 2 is a schematic Q/T graph of the process carried out in the power plant 1 according to the first embodiment. In this instance, the ordinate shows the temperature value T of the flue gas 300 and the abscissa shows the quantity of heat Q removed from the flue gas 300. A maximum energy 20 of the flue gas 300 is illustrated as a linear path. The path 30 shows the quantity of heat removed according to the process of the power plant 1. In this case, the advantage resulting from the additional removal of feed water 600 is illustrated on the additional steam throttle valve 9 as a dashed alternative path 31.

Characteristic of this Q/T graph is the pinch point 40. At this point, the path 30 has the smallest spacing with respect to the maximum energy 20, wherein this spacing is in particular configured to approximately 10° C. It is further shown in FIG. 2 that the influence of the removal of the feed water 600 which is illustrated by the dashed alternative path 31 has effects only on the temperature range below the pinch point 40. Consequently, the generation of fresh steam 400 for which primarily the temperature range above the pinch point 40 is relevant, remains untouched by the additional measure. However, it can be seen that, in comparison with the path 30 without additional removal of the feed water 600 on the additional steam throttle valve 9, a higher quantity of energy ΔQ can be removed from the flue gas 300. Consequently, a larger proportion of the energy of the flue gas 300 than in the prior art is used, whereby a degree of efficiency of the power plant 1 with regard to the prior art is increased.

FIG. 3 shows a second embodiment of the invention. The second embodiment is substantially identical to the first embodiment, wherein, in contrast to the first embodiment, the steam turbine 4 is constructed in two stages. There is therefore provision for the first stage 4a, in particular the high-pressure stage, to be operated with the fresh steam 400, as described in the first embodiment The residual steam 201 generated in this manner can in turn be mixed with the additional steam 202, in order to provide the process steam 200.

The second stage 4b of the steam turbine 4, in particular the low-pressure stage, is operated by means of a drive steam 700. The drive steam 700 is produced by means of depressurization of the residual water, which has been separated in the additional steam separation container 16 from the additional steam 202. Said residual water is depressurized by means of a drive steam throttle valve 14 to the drive steam pressure which is lower than the residual steam pressure. In the embodiment shown in FIG. 3, this drive steam pressure is 0.5 bar. Again, the drive steam 700 is supplied to a drive steam separation container 17, whereby residual water can again be separated from the drive steam 700. The residual water from the drive steam separation container 17 is returned and can pass through the preheater 7 again. For example, the residual water can be supplied to the degasser 19. This is carried out in particular when the pressure is still greater than 1 bar, otherwise the residual water is preferably supplied to the condenser 15 since the degasser 19 is advantageously operated at a pressure of approximately 1 bar (absolute).

Another difference is provided in the bypass 18 since the bypass 18 connects the output of the first stage 4a of the steam turbine 4 not to the condenser 15, but instead to the input of the second stage 4b of the steam turbine 4. If the residual steam 201 is not required as process steam 200, this can be supplied to the second stage 4b of the steam turbine 4. The second stage 4b of the steam turbine 4 converts the supplied steam, in particular the operating steam 700, into loss steam 800 which is not further used and which is supplied directly to the condenser 15.

In the second embodiment, a two-stage steam turbine 4 is consequently used. In this instance, the basic principle of removal of feed water 600 remains the same as in the first embodiment. There is only provision for the second stage 4b of the steam turbine 4 to be operated with steam 700 which is obtained from the residual water of the additional steam 202. Since the additional steam 202 has a higher pressure level than is required for operating the second stage 4b, the generation of the working steam 700 can consequently be carried out in a simple manner without the residual steam 201 of the first stage 4b having to be used. That is to say, the residual water from the additional steam 202 is used before return as in the first embodiment for driving the second stage 4b of the steam turbine 4.

FIG. 4 shows another embodiment of the invention. The power plant 1 according to a third embodiment, as shown in FIG. 4, is almost identical to the power plant 1 according to the second embodiment of the invention. The only difference is that the drive steam 700 is produced not as in the second embodiment from the residual water of the additional steam 202, but instead directly from the feed water 600. To this end, in place of the additional steam throttle valve 9, the drive steam throttle valve 14 is coupled to a feed water line between the preheater 7 and the steam drum 11. Consequently, as a result of the drive steam throttle valve 14, feed water 600 is removed and by means of depressurization to the drive steam pressure converted to drive steam 700. The drive steam separation container 17, by means of which the residual water can be separated from the drive steam 700, is present. Furthermore, the residual water is returned to an input of the preheater 7.

In the third embodiment, the generation of additional steam 202 is omitted. Consequently, the process steam 200 is formed by the residual steam 201 alone. Since the residual steam 201 does not have to be used to drive the second stage 4b of the steam turbine 4 since this is taken over by the drive steam 700, the quantity of process steam 200 in comparison with the prior art is again maximized. Consequently, the third embodiment also has the same advantages as the previous embodiments.

Finally, FIG. 5 shows a fourth embodiment of the invention. The fourth embodiment is almost identical to the third embodiment, a difference only evident in the preheater 7.

The preheater 7 according to the fourth embodiment has a first preheating region 7a and a second preheating region 7b. The first preheating region 7a and the second preheating region 7b are arranged one behind the other, wherein there is carried out between the first preheating region 7a and the second preheating region 7b the tapping of the feed water 600, in which the feed water 600 is depressurized via the drive steam throttle valve 12 to form the drive steam 700. The first preheating region 7a and the second preheating region 7b may be constructed identically so that a branching of feed water 600 is carried out precisely in the center of the preheater 7. Alternatively, the first preheating region 7a may be constructed differently from the second preheating region in order to consequently branch off the feed water 600 at any desired locations of the preheater 7 and to depressurize it via the drive steam throttle valve 14.

The fourth embodiment shown can also be combined with the first embodiment or the second embodiment. In particular, the preheater 7 can also in the first embodiment or second embodiment be divided into the first preheating region 7a and the second preheating region 7b, wherein a removal of the feed water 600 through the additional steam throttle valve 9 is carried out between the first preheating region 7a and the second preheating region 7b.

The concept according to the invention can also be used on steam turbines 4 with more than two stages. In this instance, the lower stages can also be operated with steam which has been obtained by removal and depressurization of feed water 600 at any location of the preheater 7 or between the preheater 7 and the steam drum 11.

In addition to the above, written description of the invention, for the supplementary disclosure thereof reference may be explicitly made to the drawings of the invention in FIGS. 1 to 5.

LIST OF REFERENCE NUMERALS

1 Power plant
2 Gas turbine
3 First generator
4 Steam turbine
5 Second generator
6 Heat recovery steam generator
7 Preheater
8 Evaporator
9 Additional steam throttle valve
10 Feed water pump device
11 Steam drum
12 Conveyor pump
13 Superheater
14 Drive steam throttle valve
15 Condenser
16 Additional steam separation container
17 Drive steam separation container
18 Bypass
19 Degasser
20 Maximum energy of the flue gas
21 Additional firing
22 High-pressure bypass
30 Path of the process in the power plant
31 Alternative path
40 Pinch point
100 Electrical energy
200 Process steam
201 Residual steam
202 Additional steam
300 Flue gas
400 Fresh steam
500 Fresh water
600 Feed water
700 Drive steam
800 Loss steam

The invention claimed is:

1. A power plant (1) for generating electrical energy (100) and process steam (200) comprising
    a gas turbine (2) for driving a first generator (3) for generating electrical energy (100) by burning a fuel to form flue gas (300),
    a steam turbine (4) for driving a second generator (5) for generating electrical energy (100) comprising a first stage (4a) for converting fresh steam (400) to form residual steam (201), which represents at least a portion of the process steam (200), and
    a heat recovery steam generator (6) for producing the fresh steam (400) from fresh water (500) by means of waste heat of the flue gas (300),
    wherein the residual steam (201) has a residual steam pressure which is lower than a fresh steam pressure of the fresh steam (400),
    wherein the heat recovery steam generator (6) comprises a preheater (7) for preheating the fresh water (500) to form feed water (600) and an evaporator (8) for evaporating the feed water (600) to form the fresh steam (400), and
    wherein the feed water (600) has a feed water pressure which is higher than the residual steam pressure,
    characterized by a throttle valve (9, 14) for depressurizing a portion of the feed water (600) either to the residual steam pressure in order to generate an additional steam (202) or to a drive steam pressure, which is lower than the residual steam pressure, in order to generate a drive steam (700) for operating a second stage (4b) of the steam turbine (4).

2. The power plant (1) as claimed in claim 1, characterized in that the throttle valve (9, 14) is an additional steam throttle valve (9) for depressurizing the portion of the feed water (600) to the residual steam pressure in order to generate the additional steam (202), wherein the additional steam (202) can be mixed with the residual steam (201) in order to form the process steam (200).

3. The power plant (1) as claimed in claim 2, characterized in that the steam turbine (4) comprises a second stage (4b) for converting a drive steam (700) into a loss steam (800), which is provided for condensation, wherein the drive steam (700) can be generated by depressurizing residual water from the additional steam (202) at a drive steam throttle valve (14).

4. The power plant (1) as claimed in claim 1, characterized in that the steam turbine comprises a second stage (4b) for converting the drive steam (700) to a loss steam (800),
    wherein the throttle valve (9, 14) is a drive steam throttle valve (14) for depressurizing the portion of the feed water (600) to the drive steam pressure in order to generate the drive steam (700), and
    wherein the residual steam (201) represents the entire process steam (200).

5. The power plant (1) as claimed in claim 1, characterized in that the process steam (200) is provided completely by the additional steam (202), whilst the entire residual steam (201) can be discharged via a bypass (18).

6. The power plant (1) as claimed in claim 1, characterized by a feed water pump device (10) for conveying fresh water through the preheater (7) and for generating the feed water pressure.

7. The power plant (1) as claimed in claim 1, characterized in that the heat recovery steam generator (6) has a steam drum (11) for separating fresh steam (400) and feed water (600), wherein from the steam drum (11) fresh steam (400) can be supplied to the steam turbine (4) and wherein the feed water (600) from the preheater (7) can be supplied to the steam drum (11).

8. The power plant (1) as claimed in claim 6, characterized in that the heat recovery steam generator (6) a conveyor pump (12) for conveying feed water (600) from the steam drum (11) through the evaporator (8) back into the steam drum (11) in order to generate fresh steam (400) from the feed water (600).

9. The power plant (1) as claimed in claim 1, characterized by an additional steam separation container (16) for separating residual water from the additional steam (202) and/or a drive steam separation container (17) for separating residual water from the drive steam (700).

10. The power plant (1) as claimed in claim 1, characterized by a bypass (18), via which the residual steam (201) can be transferred from an output of the steam turbine (4) to a condenser (15) or from an output of the first stage (4a) to an input of the second stage (4b).

11. The power plant (1) as claimed in claim 1, characterized in that the throttle valve (9, 14) is fitted to an output of the preheater (7), or the pre-heater (7) has a first preheating region (7a) and a second preheating region (7b) which are arranged one behind the other and between which the throttle valve (9, 14) is fitted.

12. The power plant (1) as claimed in claim 1, characterized by an additional firing for heating the flue gas (300) after discharge from the gas tur-bine (2) and/or a high-pressure bypass for bypassing the steam turbine (4) and depressurizing the fresh steam (400) to the residual steam pressure.

13. The power plant (1) as claimed in claim 1, characterized in that the throttle valve (9, 14) is configured to depressurize such a quantity of feed water (600) in order to achieve a predefined cooling of the flue gas at all load locations.

14. The power plant (1) as claimed in claim 1, characterized in that the throttle valve (9, 14) is con-figured to depressurize the feed water (600) only in part-load operation of the power plant (1).

* * * * *